United States Patent
Strietzel et al.

(10) Patent No.: US 12,085,467 B2
(45) Date of Patent: Sep. 10, 2024

(54) METHOD FOR DETECTING PRESSURE, AND PRESSURE SENSOR

(71) Applicant: INFICON AG, Balzers (LI)

(72) Inventors: Carsten Strietzel, Feldkirch (AT); Urs Wälchli, Chur (CH); Stefan Kaiser, Gamprin (LI); Christian Riesch, Bürs (AT); Bernhard Andreaus, Rapperswil (CH); Mario Weder, Bad Ragaz (CH)

(73) Assignee: INFICON AG, Balzers (LI)

( * ) Notice: Subject to any disclaimer, the term of this patent is extended or adjusted under 35 U.S.C. 154(b) by 176 days.

(21) Appl. No.: 17/762,019

(22) PCT Filed: Sep. 20, 2019

(86) PCT No.: PCT/EP2019/075367
§ 371 (c)(1),
(2) Date: Mar. 18, 2022

(87) PCT Pub. No.: WO2021/052599
PCT Pub. Date: Mar. 25, 2021

(65) Prior Publication Data
US 2022/0334016 A1 Oct. 20, 2022

(51) Int. Cl.
*G01L 21/34* (2006.01)

(52) U.S. Cl.
CPC .................. *G01L 21/34* (2013.01)

(58) Field of Classification Search
CPC ........... G01L 21/34; G01L 21/32; H01J 41/06
See application file for complete search history.

(56) References Cited

U.S. PATENT DOCUMENTS 3,196,687 A * 7/1965 Schalkowsky .......... H01J 41/06
73/705
3,398,582 A * 8/1968 McFarland ............. G01L 21/00
250/363.01
(Continued)

FOREIGN PATENT DOCUMENTS

CH 707685 A1 9/2014
JP S52-131780 A 11/1977
(Continued)

OTHER PUBLICATIONS

Klepper, C. C., et al. Application of a Species-Selective Penning Gauge to the Measurement of Neon and Hydrogen-Isotope Partial Pressures in the Plasms Boundary. Review of Scientific Instruments 68, 400 (1997). Pages 400-403.
(Continued)

*Primary Examiner* — Lee E Rodak
*Assistant Examiner* — Demetrius R Pretlow
(74) *Attorney, Agent, or Firm* — Procopio, Cory, Hargreaves & Savitch LLP

(57) ABSTRACT

The invention relates to a method 100 for determining a pressure in a vacuum system, wherein the method comprises the steps of:
  a) generating 101 a plasma in a sample chamber which is fluid-dynamically connected to the vacuum system and which is in electrical contact with a first electrode and a second electrode;
  b) measuring 102 a current intensity of an electrical current flowing through the plasma between the first electrode and the second electrode;
  c) measuring 103 a first radiation intensity of electromagnetic radiation of a first wavelength range which is emitted from the plasma, wherein the first wavelength range contains at least a first emission line of a first plasma species of a first chemical element;
(Continued)

d) measuring 104 a second radiation intensity of electromagnetic radiation of a second wavelength range which is emitted from the plasma, wherein the second wavelength range contains a second emission line of the first plasma species of the first chemical element or of a second plasma species of the first chemical element, and wherein the second emission line is outside the first wavelength range; and e) determining 105 the pressure in the vacuum system as a function of the measured current intensity, the measured first radiation intensity, and the measured second radiation intensity. Further, the invention relates to a vacuum pressure sensor.

14 Claims, 4 Drawing Sheets

(56) References Cited

U.S. PATENT DOCUMENTS

| | | | | |
|---|---|---|---|---|
| 4,000,457 | A * | 12/1976 | O'Neal, III | H01J 41/06 250/386 |
| 4,270,091 | A * | 5/1981 | Mann | G01L 21/32 324/462 |
| 4,547,769 | A * | 10/1985 | Tanigaki | G01R 31/3275 340/626 |
| 4,692,630 | A * | 9/1987 | Gogol | G01N 21/62 250/423 P |
| 4,988,871 | A * | 1/1991 | Gogol | G01L 21/00 850/16 |
| 5,157,333 | A * | 10/1992 | Peacock | H01J 41/06 324/463 |
| 5,170,057 | A * | 12/1992 | Danielson | G01N 21/33 250/372 |
| 5,198,772 | A * | 3/1993 | Peacock | H01J 41/06 250/382 |
| 5,570,179 | A * | 10/1996 | Weckstrom | G01N 21/69 356/417 |
| 5,889,281 | A * | 3/1999 | Holkeboer | H01J 49/42 250/288 |
| 6,351,131 | B1 * | 2/2002 | Klepper | G01L 21/34 324/463 |
| 7,248,062 | B1 * | 7/2007 | Samsavar | G01R 31/303 257/E21.531 |
| 7,728,984 | B2 * | 6/2010 | Waegli | G01K 11/3206 356/454 |
| 7,795,876 | B2 * | 9/2010 | Wetzig | H01J 41/06 324/460 |
| 8,756,978 | B2 * | 6/2014 | Schwartz | G01M 3/38 73/49.3 |
| 2002/0153820 | A1 * | 10/2002 | Ellefson | H01J 41/12 313/362.1 |
| 2006/0202701 | A1 * | 9/2006 | Knapp | G01L 21/32 324/460 |
| 2008/0202211 | A1 * | 8/2008 | Wetzig | G01N 33/005 73/40.7 |
| 2008/0278173 | A1 * | 11/2008 | Xiao | G01L 21/34 977/939 |
| 2009/0096460 | A1 * | 4/2009 | Watanabe | G01L 21/32 324/462 |
| 2012/0287418 | A1 * | 11/2012 | Scherer | G01N 21/39 356/51 |
| 2016/0025587 | A1 * | 1/2016 | Andreaus | G01L 21/34 324/463 |
| 2017/0254714 | A1 * | 9/2017 | Yoshida | G01N 27/62 |
| 2018/0038800 | A1 * | 2/2018 | Gamache | G01N 21/67 |

FOREIGN PATENT DOCUMENTS

| | | |
|---|---|---|
| JP | S58-139042 A | 8/1983 |
| JP | 2000-133640 A | 5/2000 |
| JP | 2016-170072 A | 9/2016 |
| WO | 2019162681 A1 | 8/2019 |

OTHER PUBLICATIONS

International Preliminary Report of Patentability for PCT/EP2019/075367. Mailed Mar. 31, 2022. Pgs. 7.

PCT; International Search Report issued in International Patent Application No. PCT/EP2019/075367; mailed Jul. 14, 2020, 6 Pages including translation.

PCT; Written Opinion issued in International Patent Application No. PCT/EP2019/075368; mailed Jul. 14, 2020, 7 Pages.

C. C. Klepper et al. "Application of a species-selective Penning gauge to the measurement of neon and hydrogen-isotope partial pressures in the plasma boundary" Review of Scientific Instruments., US, vol. 68, No. 1, Jan. 1, 1997 (Jan. 1, 1997), pp. 400-403.

* cited by examiner

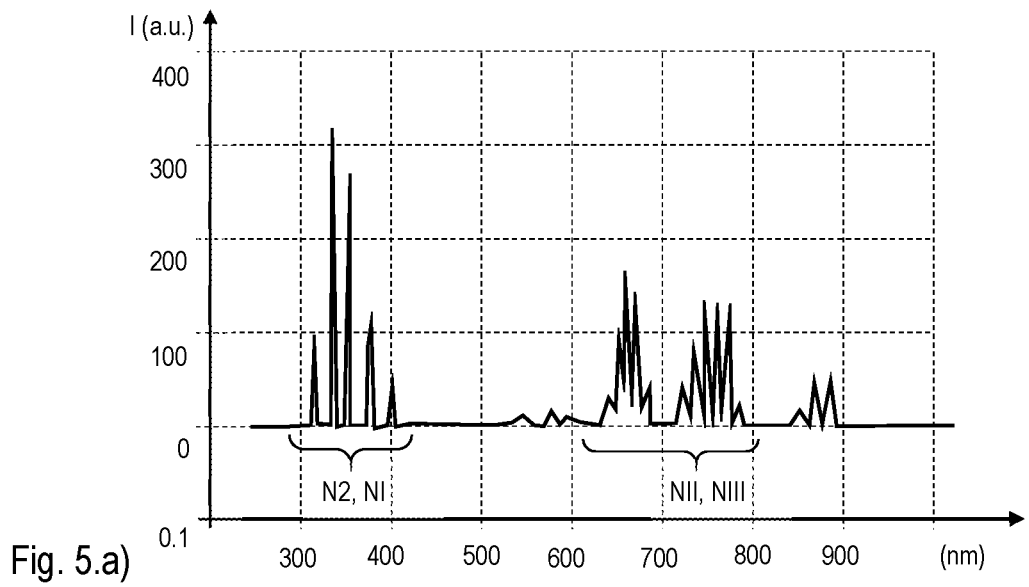
Fig. 5.a)
Fig. 5.b)
Fig. 5.c)
Fig. 5.d)
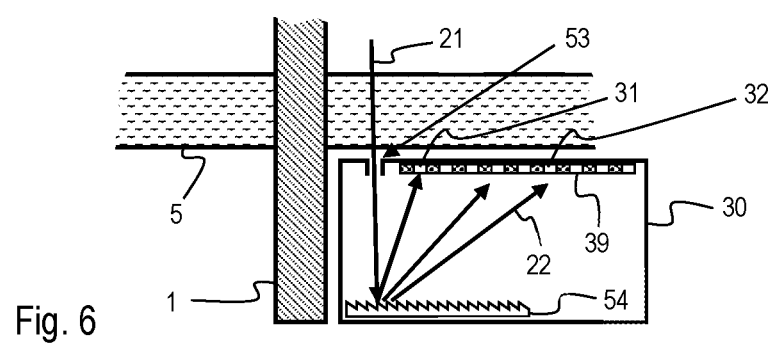
Fig. 6

METHOD FOR DETECTING PRESSURE, AND PRESSURE SENSOR

CROSS-REFERENCE TO RELATED APPLICATIONS

This application is US National Stage of International Patent Application PCT/EP2019/075367, filed Sep. 20, 2019, the contents of which are incorporated herein by reference.

The present invention relates to a method for determining a pressure in a vacuum system, a vacuum pressure sensor, a device for carrying out the method, an application of the method, and a use of the pressure sensor.

Vacuum pressure sensors or vacuum gauges with which pressures significantly below normal pressure can be determined are known. Among the known vacuum pressure sensors, so-called ionization vacuum gauges have a particularly wide measuring range. They measure pressure via the detour of gas ionization. First, the ionizability of the residual gas and thus the gas density in the vacuum system is determined. The electrons required for ionization of the gas are generated either by a hot cathode (hot cathode ionization vacuum gauge) or in an independent gas discharge between cold electrodes (cold cathode vacuum gauge). Since the independent gas discharge between cold electrodes is extinguished at pressures of around $10^{-3}$ mbar, the measuring range of cold cathode ionization gauges has been extended to pressures in the high-vacuum range by the arrangement described in patent specification DE 716 712 by F. M. PENNING, using a magnetic field which substantially lengthens the electron paths in the independent electric gas discharge and thus increases the ion yield. These Penning vacuum gauges are widely used and have been further technically improved over the years.

Commonly used nowadays is the configuration proposed by HOBSON and REDHEAD (Redhead, P. A. (1959), The magnetron gauge, a cold cathode vacuum gauge, Can. J. Phys. 37, 1260-1271) in the form of an inverted magnetron. This is capable of covering a pressure range from about $10^{-3}$ mbar to the ultrahigh vacuum range. Penning vacuum gauges, as well as cold cathode vacuum gauges based on a magnetron or an inverted magnetron array, have in common that an electric field is essentially perpendicular to a magnetic field.

One of the main problems of the known configurations is the limitation of the pressure range towards high pressures. Due to a change in the dominant fraction in the discharge, an ambiguity arises in the current measurement. This is caused by the fact that both electrons and ions contribute to the measured current. Depending on the pressure, the nature of the resulting plasma changes. A typical pressure-current intensity calibration curve of a cold cathode vacuum gauge shows for pressures below approx. $10^{-3}$ mbar a range in which the current increases monotonically with increasing pressure. This is the usable measuring range in which the pressure can be determined unambiguously from a measured current. Ring currents with electrons dominate in this range. The pressure-current intensity calibration curve typically shows a current maximum at about $10^{-2}$ mbar. At pressures above this maximum, the current decreases with increasing pressure. In this pressure range, the plasma, i.e., the mixture of electrons and positively charged ions, dominates. Conventionally, the usable measuring range cannot be extended beyond the aforementioned current intensity maximum.

It was the object of the present invention to find improved methods for determining a vacuum pressure compared to the prior art. It was a further object of the present invention to provide an alternative vacuum pressure sensor, namely with an increased usable measuring range.

According to the invention, this object is solved by a method according to claim 1.

The method according to the invention is a method for determining a pressure in a vacuum system. The method comprises the following steps:
  a) generating a plasma in a sample chamber which is fluid-dynamically connected to the vacuum system and wherein the plasma is in electrical contact with a first electrode and a second electrode;
  b) measuring a current intensity of an electrical current flowing through the plasma between the first electrode and the second electrode;
  c) measuring a first radiation intensity of electromagnetic radiation of a first wavelength range which is emitted from the plasma, wherein the first wavelength range contains at least a first emission line of a first plasma species of a first chemical element;
  d) measuring a second radiation intensity of electromagnetic radiation of a second wavelength range which is emitted from the plasma, wherein the second wavelength range contains a second emission line of the first plasma species of the first chemical element or of a second plasma species of the first chemical element, and wherein the second emission line lies outside the first wavelength range; and
  e) determining the pressure in the vacuum system as a function of the measured current intensity, the measured first radiation intensity and the measured second radiation intensity.

Electromagnetic radiation and charged particles are produced with the generated plasma. Based on the charged particles generated in the plasma, the particle density in the sample chamber can be determined by measuring a current flowing in the plasma using a current meter. The particle density in the sample chamber can be used to infer the pressure in the sample chamber. The sample chamber is fluid-dynamically connected to the vacuum system so that there is pressure equalization between the vacuum system and the sample chamber, and the pressure determined in the sample chamber matches the pressure in the vacuum system. The sample chamber extends in such a way between the electrodes, which are isolated from each other, that a plasma generated in the sample chamber can be in contact with both the first electrode and the second electrode. The current meter may be any charge rate meter, such as an ampmeter or an electron counter. A wide variety of plasma sources can be used to generate the plasma. Electron cyclotron resonance (ECR) ion sources, Penning discharges, inductively coupled plasma (ICP) or glow discharge sources, etc. are suitable for the method according to the invention. Penning, magnetron and inverted magnetron arrays are suitable for generating the plasma, since these arrays can be built very compactly and ensure sufficient ion yield even at low pressures, in particular at pressures down to $10^{-8}$ mbar. The latter three plasma sources are grouped under the collective term ExB sources.

The inventors have recognized that by measuring the intensities in two different, cleverly chosen wavelength ranges of the electromagnetic radiation emitted by the plasma, in particular of electromagnetic radiation in the optical range, additional information about the pressure in the sample chamber is obtained, by means of which an ambiguity in the assignment of a pressure to the measurement result of a current measurement can be resolved.

The measured intensities of electromagnetic radiation refer, for example, to radiation intensities in the optical range, i.e. radiation intensities of visible light, of ultraviolet radiation or of infrared radiation, in particular from the near infrared range. Atoms and ions in a plasma emit radiation in this wavelength range, which shows emission lines that are characteristic for the respective chemical element. The wavelengths of these characteristic emission lines are known from the field of Atomic Emission Spectroscopy (AES) and can be looked up for a gas to be measured. Depending on the application, a gas to be measured can be, for example, nitrogen, oxygen, argon or helium.

According to the invention, a first radiation intensity of electromagnetic radiation of a first wavelength range is measured and a second radiation intensity of electromagnetic radiation of a second wavelength range is measured. The first and second wavelength ranges are selected such that a first emission line is included in the first wavelength range, but a second emission line is excluded. In the second wavelength range, however, the second emission line is observable. First and second wavelength ranges can be selected to be very narrow, i.e., for example, only slightly more than the natural line widths of the first and second emission lines, respectively, so that essentially only the first and second emission lines, respectively, lie in the respective wavelength range. The second wavelength range can be selected so large that the first emission line also lies in the second wavelength range. The first and second emission lines are emission lines from plasma species of the same chemical element, referred to herein as the first chemical element. They may be first and second emission lines of the same first plasma species. Alternatively, the second emission line may be an emission line of a second plasma species that is different from the first plasma species, but which is a plasma species of the same first chemical element. For us, plasma species means gaseous atoms and chemical compounds characterized by a chemical structural formula, their charge state (e.g. neutral, singly ionized, doubly ionized) and, optionally, their excited state. A plasma species of an element contains that element in its structural formula. For example, the neutral nitrogen molecule $N_2$, the neutral nitrogen atom NI, a singly ionized nitrogen atom NII, and a doubly ionized nitrogen atom NIII are four different plasma species of the chemical element nitrogen. As another example, the neutral argon atom Ar and the argon ion $Ar^+$ are two different plasma species of the chemical element argon. By observing two different emission lines from one or two plasma species of the same chemical element according to the invention, another pressure-dependent parameter can be determined in addition to the current intensity. In the event that emission lines from plasma species with a structural formula with more than two atoms are observed, it is advantageous if the emission lines belong to plasma species which not only have a common chemical element, but also share as large parts of the structural formula as possible. In this way, the intensity ratio from the measured first and second intensity is mainly dependent on the particle density in the plasma, i.e. on the pressure. A dependence on the composition of the residual gas is thus reduced. Preferably, the first and second emission lines are emission lines of the same gas, i.e. emission lines of the same atom or molecule in the gaseous state or plasma state.

As a final step of the method, the pressure in the vacuum system is determined as a function of the measured current intensity, the measured first radiation intensity, and the measured second radiation intensity. For example, the first and second radiation intensities can be calculated into a ratio of radiation intensity and then the pressure can be determined as a function of measured current intensity and the calculated ratio of radiation intensities.

The measurements of the current intensity, the first radiation intensity, and the second radiation intensity can be made simultaneously or with a time delay with respect to each other. For example, once the plasma is generated, the above measurements can be repeated periodically or performed continuously to monitor changes in the pressure of the vacuum system periodically or continuously. For this purpose, the plasma must be maintained by supplying energy. Variants of the method in which a plasma is generated before each measurement are also conceivable.

Variants of the method result from the features of dependent claims 2 and 3.

In one variant of the method, in step e) of determining the pressure in the vacuum system, an estimated value of the pressure is determined based on the measured first radiation intensity and the measured second radiation intensity. A definition range of a pressure-current intensity calibration curve is restricted to a pressure range that includes the estimated value and in which the pressure-current intensity calibration curve is monotonic. Based on the pressure-current intensity calibration curve in the restricted definition range and based on the measured current, the pressure in the vacuum system is determined.

This variant of the method allows the determination of a pressure over a large measuring range, even if the pressure-current intensity calibration curve has monotonically increasing and monotonically decreasing sections over the entire measuring range. It is not yet necessary to determine an exact pressure from the two measured radiances. It is sufficient if an estimated value for the pressure can be determined, with the knowledge of which the pressure values in question can be restricted with sufficient certainty to a monotonous range of the pressure-current intensity calibration curve. Then the assignment of the pressure to the measured amperage becomes unambiguous and the pressure can be determined with the high precision typical of amperage measurement.

In one variant of the method, a logarithm of the estimated value p0 of the pressure is determined using the formula $$\log(p0) = a(I\_1/I\_2) + b.$$

Here, a and b are coefficients determined in advance, which depend on the choice of emission lines, the arrangement used to generate the plasma and the base of the logarithm.

This variant of the method provides a very simple and robust estimate of the magnitude of the pressure based on a linear function of the intensity ratio of the first and second radiation intensities. A pressure range around this estimate can then be used as a constrained definition range for the pressure. For example, if the estimated value p0 estimates the true pressure with an error tolerance of Δp, the restricted definition range for the pressure can be chosen from (p0−10*Δp) to (p0+10*Δp).

The coefficients a and b can be determined by calibration measurements at known pressure. With a change of the base of the logarithm (e.g. logarithm to base e, or logarithm to base 10) the coefficients a and b change by the same factor.

The object is further solved by a vacuum pressure sensor according to claim 4.

The vacuum pressure sensor according to the invention comprises:

a sample chamber in which a plasma can be generated, wherein the sample chamber has electrical contact with a first electrode and with a second electrode, a current measuring device electrically connected to the first and to the second electrode and connected in series to the sample chamber, a wavelength-selective element, and a first and a second detector element for measuring a radiation intensity of an electromagnetic radiation.

The wavelength-selective element, the first detector element and the second detector element are arranged such that only electromagnetic radiation of a first wavelength range emanating from the sample chamber can arrive in the first detector element and that only electromagnetic radiation of a second wavelength range emanating from the sample chamber can arrive in the second detector element. In the first wavelength range lies at least a first emission line of a first plasma species of a first chemical element. A second emission line of the first plasma species of the first chemical element or a second plasma species of the first chemical element lies in the second wavelength range. The second emission line lies outside the first wavelength range.

The vacuum pressure sensor according to the invention is suitable to perform the measurements according to steps b), c) and d) of the method according to the invention. In this regard, the wavelength-selective element and the first and second detector elements enable the measurements of the radiation intensity from the first and second wavelength ranges, respectively, wherein these two wavelength ranges are selected as discussed above in connection with the method according to the invention.

The wavelength-selective element may be, for example, an optical filter with narrowband, wideband, or bandpass characteristics. Such an optical filter may, for example, be placed immediately in front of one of the detector elements, so that electromagnetic radiation from the plasma arriving at the corresponding detector element must pass through the optical filter. Such a filter may be, for example, an interference filter that is reflective in certain wavelength ranges and transparent to radiation in other wavelength ranges. The filter may be a color filter with transmission greater than 95% in a selected wavelength range. Thus, radiation with the wavelengths transmitted by the filter is primarily still present in the radiation path after the filter. The wavelength-selective element can also be, for example, an optical grating or a prism, so that electromagnetic radiation is diffracted or refracted in different directions depending on the wavelength. The detector elements can then be positioned in the corresponding direction.

The vacuum pressure sensor can, for example, have a connection opening, e.g. as a connection opening of a measurement chamber. The sample volume can be fluid-dynamically connected to a vacuum system via such a connection opening. In this case, the vacuum pressure sensor can be manufactured and maintained independently of the vacuum system. For example, the connection opening may be surrounded by a standard vacuum flange. Alternatively, the vacuum pressure sensor can also be installed in a vacuum system.

For example, the sample chamber may be surrounded by a measurement chamber. At least one of the first and second electrodes can be partially or completely formed as a wall of a measurement chamber of the vacuum pressure sensor.

Embodiments of the vacuum pressure sensor are apparent from the features of claims to 5 to 12.

One embodiment of the vacuum pressure sensor includes a measurement chamber surrounding the sample chamber. The measurement chamber has a window in a wall of the measurement chamber or as a wall of the measurement chamber. The window is transparent in an optical wavelength range. A continuous first radiation path starting from the sample chamber and traversing the window and terminating in the first detector element is defined. A continuous second radiation path is defined which, starting from the sample chamber, traverses the window and ends in the second detector element.

In this embodiment, the sample chamber and the two detector elements are on different sides of the window. The window can be made of sapphire or quartz glass, for example. Windows made of sapphire or quartz glass are transparent for practically the entire optical wavelength range, are chemically inert, i.e. are not attacked by the plasma or any process gases, have high mechanical strength and are vacuum compatible. Sapphire in particular has very high transmission in the wavelength range of 250-1000 nanometers. With a window made of sapphire or quartz glass, the optical detector elements can be separated from the vacuum or plasma in the sample volume, or from any process gases, without having to accept losses in the detectable radiation intensity coming from the sample volume. The optical detector elements can be installed directly behind the window, as seen from the sample volume, which results in high sensitivity to radiation intensity from the sample volume on the one hand and enables a very compact design of the entire pressure sensor on the other.

In the embodiment with a window, the first and second detector elements can be arranged outside the measurement chamber. In this case, the first and second detector elements do not need to meet any requirements regarding vacuum suitability.

The window can, for example, have two planar, mutually parallel boundary surfaces, wherein a first boundary surface faces a vacuum side and a second boundary surface faces a detector side. The window may additionally have the function of an electrical feedthrough, in particular a high-voltage feedthrough, especially for feeding a central anode into the sample chamber. Further, one or more boundary surfaces of the window may be curved and thus have a focusing effect on electromagnetic radiation paths. In particular, the geometry of the boundary surfaces may be designed to focus radiation paths emerging from the plasma onto at least one of the detector elements. An increase of radiation intensity on the first and/or second detector element and thus more accurate evaluation of the spectral lines is achievable with this variant of the embodiment. In this way, the window can be seen, for example, as an electro-optical feedthrough with lens effect.

In one embodiment of the vacuum pressure sensor, the first detector element and/or the second detector element is a photodiode, a phototransistor, a charge-coupled device (abbreviated CCD), a multi-channel plate (abbreviated MCR), or a channel electron multiplier (abbreviated CEM).

With a photodiode or phototransistor, the optical wavelength range relevant for evaluating the emission lines of the gas to be measured, i.e. infrared, visible range and ultraviolet, can be well covered. For example, silicon-based photodiodes or phototransistors can be used to cover a sensitivity range for wavelengths of approximately 190-1100 nanometers. With germanium-based photodiodes or phototransistors, for example, a sensitivity range for wavelengths of approximately 400-1700 nanometers can be covered. The use of single photodiodes has the advantage that they can cover a relatively large entrance area, thus a lot of sensitivity is gained, e.g. compared to the use of a spectrometer.

Photodiodes or phototransistors are relatively inexpensive detector elements. Photodiodes or phototransistors have a small footprint compared to other detector elements and thus allow a compact design of the vacuum pressure sensor.

In one embodiment, the vacuum pressure sensor comprises a miniature spectrometer comprising a detector array, and the first detector element and the second detector element are elements of the detector array.

For example, a miniature spectrometer may have a slot or hole where the first radiation path enters the miniature spectrometer. An optical grating or prism ensures that the incident radiation is diffracted or deflected in different directions and falls on the different elements of a detector array. In this way, an intensity spectrum of the radiation emitted from the sample volume can be determined. Miniature spectrometers with geometric dimensions on the order of 20 mm×10 mm×10 mm are commercially available. This allows for a compact design of the vacuum pressure sensor. A detector array may be designed, for example, as a photodiode array or as an array of phototransistors. A detector array may, for example, be implemented as an array of CCD elements. First and second wavelength ranges may each be covered by a single element of the detector. It is also possible to add the measured intensities of several, e.g. several adjacent, elements to the measured first or second radiation intensity.

In one embodiment, the vacuum pressure sensor includes a device for generating a magnetic field in the sample chamber.

The device for generating the magnetic field in the sample volume can be, for example, a coil. The device for generating a magnetic field in the sample volume can also be, for example, an array of permanent magnets. Additionally, ferromagnetic elements may also be used to guide the magnetic fields generated by the device to achieve the desired magnetic field distribution in the sample volume. In this embodiment, the electric fields generated by the first and second electrodes and the magnetic fields that are from the device to generate a magnetic field in the sample volume may be arranged to generate a plasma very efficiently. The electric fields accelerate the electrons to energies greater than the ionization potential and the magnetic fields, on the one hand, extend the trajectories, which gives a higher probability of collision with another particle, and, on the other hand, keep the electrons in orbits of about hundreds of electron volts, where the maximum cross-section of action with molecules and atoms lies.

In one embodiment of the vacuum pressure sensor with a device for generating a magnetic field in the sample chamber, the arrangement of first electrode, second electrode and the device for generating a magnetic field in the sample chamber is designed such that by applying an electric voltage to the electrodes, an electric field can be generated which is aligned substantially perpendicular to the magnetic field in the sample chamber. In this embodiment, the arrangement of the first electrode, second electrode and the device for generating a magnetic field can be designed in particular as a magnetron array, inverted magnetron array or Penning array, i.e. it can be a so-called ExB plasma source.

In an ExB plasma source, the device for generating the magnetic field in the sample volume can be arranged so that the field lines of the magnetic and electric fields in the sample volume cross at essentially a right angle.

The inventors have recognized that magnetron arrays, inverted-magnetron arrays and Penning arrays prove to be particularly effective. Effective in this context means that the range of the sample volume with maximum emission of photons is spatially stable over a large pressure range, for example over several powers of ten in pressure. For example, with an inverted magnetron array it can be achieved that the range of the sample volume with maximum emission of photons is spatially stable over more than 10 powers of ten in pressure. Whether the discharge is ignited at $10^{-9}$ mbar or at 10 mbar, the volumes with maximum emission are always located at largely the same place, respectively in a torus-shaped region with always the same diameter. Furthermore, this spatial region is readily accessible for observation in the aforementioned electrode arrangements. This allows the use of a very simple detector element, namely the attachment of photodiodes with color filters (and if necessary a small focus lens), for example directly adjacent to the window around a central anode. Instead of the diodes, a miniature spectrometer can also be installed directly adjacent to the window, for example.

In one embodiment, the vacuum pressure sensor includes an energy source for supplying energy to a plasma in the sample chamber.

In order to maintain a plasma, an energy source is required, which in principle can also be provided independently of the vacuum pressure sensor according to the invention, but which can act into the sample chamber. In the embodiment discussed, the energy source is part of the vacuum pressure sensor, resulting in particularly easy-to-use and compact arrangements. The supply of energy from the energy source into the plasma can, for example, take place via electrically conductive contacts, capacitively, inductively or via radiation, for example laser radiation or microwave radiation.

In one embodiment of a vacuum pressure sensor having an energy source for supplying energy to a plasma in the sample chamber, the energy source comprises a high-voltage source which is electrically conductively connected to the first and second electrodes and which is connected in series to the current measuring device.

In one embodiment of a vacuum pressure sensor having a power source for supplying power to a plasma in the sample chamber, the power source comprises an AC power source and comprises an induction coil, wherein the induction coil is electrically connected to the AC power source and is adapted to generate an alternating magnetic field in the sample chamber when AC power is passed through the induction coil.

Features of embodiments of the vacuum pressure sensor may be combined as desired, provided they do not conflict with each other.

Further, the invention is directed to a device according to claim 13. This is a device for carrying out the method according to the invention. The device comprises a vacuum pressure sensor according to the invention and a processing unit. The vacuum pressure sensor may have the features of any of the above embodiments. The processing unit is operatively connected to the current intensity measuring device, the first and second electromagnetic radiation detecting elements for transmitting the measured current intensity, the measured first radiation intensity and the measured second radiation intensity. The processing unit is adapted to determine, as a function of the measured current intensity, the measured first radiation intensity, and the measured second radiation intensity, the pressure in the vacuum system.

The processing unit may comprise a digital computer, an analog computer, or a suitable electronic circuit. For example, a suitable electronic circuit may comprise two amplifiers with logarithmic response function, each connected upstream of an input of an operational amplifier. Such an electronic circuit can be used, for example, to form the logarithmic ratio of the first and second radiation intensities when the output signal of the first and second detector elements are each applied to an input of one of the two amplifiers. The processing unit may in particular comprise a microprocessor or a digital signal processor. The processing unit may in particular be programmed to execute method step e) from the method according to the invention or a variant of the method when the measured current intensity, the measured first radiation intensity and the measured second radiation intensity are available as input values. These input values may be transmitted to the processing unit as an analog or digital signal, via electrical lines, or in a wireless manner. The processing unit may be incorporated into a housing of a vacuum pressure sensor. The processing unit may comprise memory means for storing calibration data, in particular pressure-current intensity calibration curves or coefficients a and b according to a variant of the method.

Further, the invention is directed to an application according to claim 14.

This is an application of the method according to the invention for extending the pressure measurement range of a vacuum pressure sensor based on a measurement of a current intensity through a plasma. In particular, it may be a vacuum pressure sensor based on the operating principle of a cold cathode vacuum gauge. In this case, the pressure measurement range is extended to a pressure measurement range that includes both pressures below and pressures above an extreme value of a pressure-current intensity characteristic curve of the vacuum pressure sensor.

If the pressure-current intensity characteristic curve of a vacuum pressure sensor based on a measurement of a current intensity through a plasma exhibits an extreme value, i.e. a minimum or a maximum, the assignment of a measured current intensity to a pressure is not unambiguous. Usually, it is necessary to provide restriction to a pressure measurement range that either includes only pressures below the pressure at which the extreme value occurs, or includes only pressures above the pressure at which the extreme value occurs. By using the method according to the invention, the ambiguity can be removed and an extended pressure measurement range on both sides of the extreme value can be covered with the vacuum pressure sensor.

Thus, the application of the method according to the invention enables, for example, a wide-range cold cathode vacuum gauge.

Further within the scope of the invention is the use according to the invention is the use of a vacuum pressure sensor according to the invention in a method according to the invention. In this context, embodiments of the vacuum pressure sensor can be combined with variants of the method as desired, if not contradictory.

Exemplary embodiments of the present invention are explained in further detail below with reference to figures, wherein:

FIG. 5 shows a schematic nitrogen emission spectrum showing examples of a first and a second wavelength range;

FIG. 6 shows a schematic cross-section through a detail of an embodiment of a vacuum pressure sensor;

Figure 1:
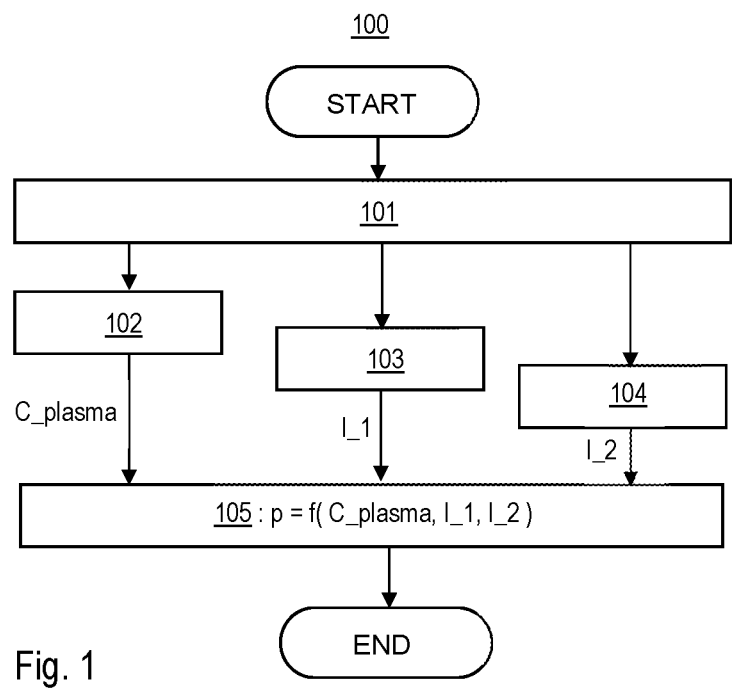
FIG. 1 shows a flow diagram of the method according to the invention.

FIG. 1 shows the steps of the method 100 for determining a pressure in a vacuum system as blocks in a flow chart. The method starts with the step of generating 101 a plasma in a sample chamber 20, which is fluid-dynamically connected to the vacuum system and which is in electrical contact with a first electrode and a second electrode.

Three measurement processes 102, 103, 104 are performed in parallel or shifted in time, which is represented by the slightly offset blocks in the flow diagram. All three measurement operations relate to measurements on the previously generated plasma. These are the steps of:

measuring 102 a current intensity C_plasma of an electric current flowing through the plasma between the first electrode and the second electrode, measuring 103 a first radiation intensity I_1 of electromagnetic radiation of a first wavelength range emitted from the plasma, measuring 104 a second radiation intensity I_2 of electromagnetic radiation of a second wavelength range emitted from the plasma.

The first and second wavelength ranges are defined as described above for the method according to the invention.

As a final step, based on the measurement results C_plasma, I_1 and I_2 of the measurement processes, the determination 105 of the pressure p in the vacuum system takes place as a function of the measured current intensity C_plasma, the measured first radiation intensity I_1 and the measured second radiation intensity I_2. This relationship is expressed by the formula p=f(C_plasma, I_1, I_2), wherein f symbolizes a mathematical function or a mathematical procedure which, in variants of the method, can also process other inputs in addition to the three measured values, e.g. calibration coefficients, a calibration curve or a calibration surface.

Figure 2:
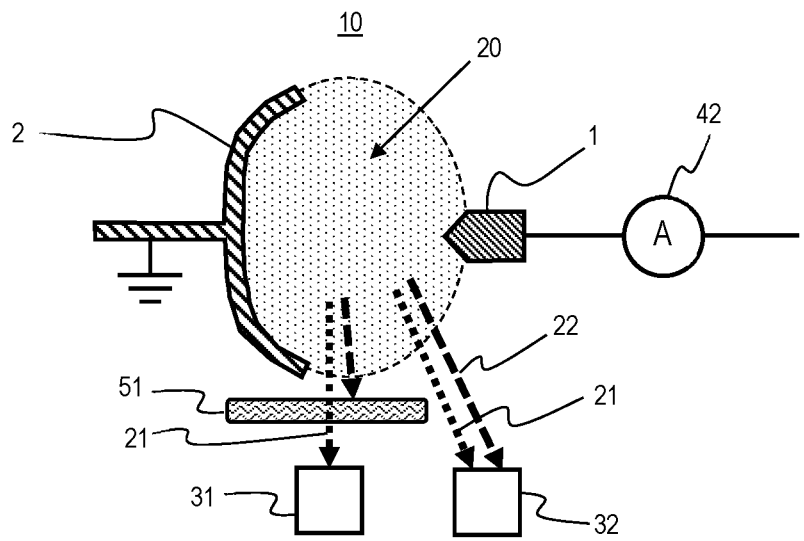
FIG. 2 shows a schematic representation of a vacuum pressure sensor according to the invention.

FIG. 2 shows a schematic, highly simplified and partially cross-sectional view of a vacuum pressure sensor 10 according to the invention. A sample chamber 20 is located in the center. A plasma—indicated by dots—can be generated in this sample chamber. A first electrode 1 and a second electrode 2 are in electrical contact with the plasma in the sample chamber. A current measuring device 42 is electrically connected to the first and second electrodes and is connected in series with the sample chamber. A wavelength-selective element 51 is mounted in front of a first detector element 31 such that radiation 21 of a first emission line (shown as a dashed arrow with short dashes) can reach the detector element 31, but radiation 22 of a second emission line (shown as a dashed arrow with long dashes) is blocked. Radiation 21, 22 of the first and second emission lines reaches a second detector element 32. The arrows represent each possible radiation path from the plasma to the detector elements 31, 32.

Figure 3:
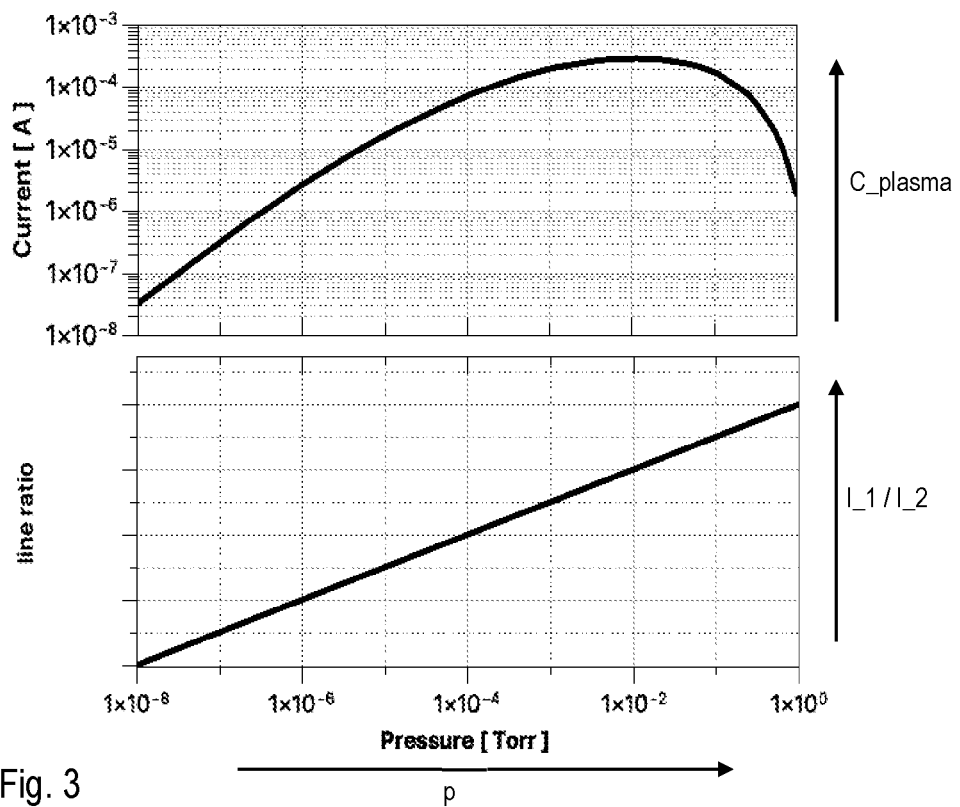
FIG. 3 shows a graphical representation of the relationship between pressure and current intensity and between pressure and radiation intensity ratio, respectively, in one embodiment of the vacuum pressure sensor.

FIG. 3 shows in the upper graph a typical calibration curve of the current intensity C_plasma in amperes flowing through the plasma as a function of the pressure p in the sample chamber of a vacuum pressure sensor. The lower graph shows a typical calibration curve for the ratio I_1/I_2, i.e. the ratio of measured first radiation intensity I_1 to measured second radiation intensity I_2, as a function of pressure p in the same vacuum pressure sensor. In this case, these are calibration curves of an embodiment of the vacuum pressure sensor designed as a cold cathode vacuum gauge. The horizontally drawn axis with the pressure p in Torr applies to both curves. The pressure is plotted on a logarithmic scale so that the dependence on pressure can be read over 8 orders of magnitude from $10^{-8}$ Torr to $10^0$ Torr. The current intensity C_plasma is also plotted on a logarithmic scale, ranging over 5 orders of magnitude from $10^{-8}$ amperes to $10^{-3}$ amperes.

The current intensity C_plasma has a maximum at a pressure near $10^{-2}$ Torr. For a current intensity C_plasma in the range between approx. $2*10^{-6}$ amperes and approx. $3*10^{-4}$ amperes, there are two pressure values p which can lead to this current intensity. The ratio I_1/I_2 is plotted on a linear scale. Zero point and slope are not fixed at the shown ratio I_1/I_2. It can be seen that there is a linear relationship between the logarithm of the pressure and I_1/I_2, which can be described by a slope a and a constant term b. If the ratio I_1/I_2 is known, the ambiguity of the relationship between current intensity C_plasma and pressure p can be resolved.

Figure 4:
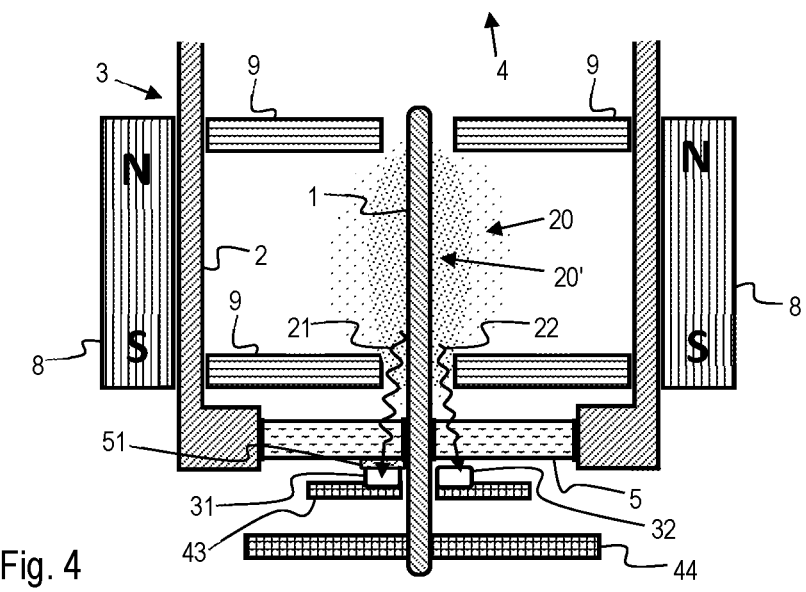
FIG. 4 shows a schematic cross-section through part of an embodiment of a vacuum pressure sensor.

In FIG. 4 a cross-section through a part of an embodiment of a pressure sensor is shown. The second electrode is formed as a wall of the measurement chamber 3 and has essentially the shape of a hollow cylinder. In this arrangement, the second electrode can be operated, for example, as a cathode. The first electrode 1 in the form of a rod lies on the axis of the hollow cylinder. In this arrangement, the first electrode can be operated, for example, as an anode. The embodiment shown comprises a device 8 for generating a magnetic field in the sample volume, which is designed as a permanent magnet. "N" and "S" denote the position of north and south poles of the permanent magnet ring. Magnetic elements 9 form a magnetic return for the magnetic fields generated by the device 8. In the sample volume 20, where a plasma can be generated, there exists a central region 20' where the maximum glow in the sample volume occurs when a plasma is generated. Radiation emitted from the plasma can pass from this region 20' along a first radiation path 21 and along a second radiation path 22 through the window 5 to the first detector element 31 and the second detector element 32, respectively. A wavelength-selective element in the form of a filter 51 is arranged upstream of the first detector element 31 in the direction towards the sample chamber 20. The filter 51 allows radiation in the wavelength range of a first emission line to pass and blocks at least the wavelength range of a second emission line. The material of the window 5 is selected to transmit radiation from the wavelength range of the first and second emission lines. For example, the window may be formed by a sapphire plate or a quartz glass plate. In the illustrated embodiment, the detector elements are arranged on a circuit board 43 which supports the detector elements. A further circuit board 44, adjacent to the first electrode, for the voltage supply with high voltage is arranged below the circuit board 43. An arrow indicates the possible position of an optional connection opening 4 for connection to a vacuum system. The connection opening and vacuum system are not shown in this figure. In the embodiment shown, the window 5 also forms a vacuum-tight electrical feedthrough for the first electrode 1. The first electrode can, for example, be glazed into the window by means of a solder glass ring and thus be connected to the window in a vacuum-tight manner. In the embodiment shown, the window is bounded by a flat bounding surface both towards the vacuum side and towards the side with the detector elements 31 and 32. The window 5 is connected to the second electrode 2 in a vacuum-tight manner at its outer periphery. This connection can also be made, for example, by glazing with a solder glass ring. FIG. 5.a) shows a schematic representation of an emission spectrum of plasma species of the element nitrogen. Intensities I in arbitrary units (a.u.) are plotted against the wavelength λ in nanometers (nm). Groups of emission lines in the range 300-400 nm belong in part to molecular nitrogen N2 and atomic nitrogen NI. Groups of emission lines in the range 600-800 nm belong in part to singly and doubly (NIII) ionized nitrogen. Strictly speaking, the lines of N2, NI, NII and NIII occur intermixed in the frequency ranges. Nitrogen is an important residual gas in vacuum systems. The method according to the invention may relate, for example, to plasma species of the chemical element nitrogen. Three possibilities for defining first and second wavelength ranges are shown in FIGS. 5.b), 5.c) and 5.d), wherein the wavelength ranges each refer to the wavelength axis of FIG. 5.a).

As shown in FIG. 5.b), the first wavelength range W1 can, for example, cover a range of 300-400 nm and contain, among other things, several emission lines of plasma species of N2 and NI. In this case, the second wavelength range W2 covers a range of 600-800 nm and thus exclusively contains emission lines not included in the first wavelength range. FIG. 5.c) shows an example with narrowly selected first W1' and second W2' wavelength range, each comprising a single emission line of a plasma species from the N2 and N group. FIG. 5.d) shows another example where the second wavelength range W2" completely overlaps the first wavelength range W1" and additionally covers a large wavelength range comprising multiple emission lines of plasma species N2 and N.

FIG. 6 shows in cross-section a detail of an embodiment in which a miniature spectrometer 30 is mounted immediately adjacent to the window 5. The first radiation path 21 passes through the window 5 through a slot 53 in a housing of the miniature spectrometer onto a grating 54, creating fanned-out radiation paths, wherein each of the fanned-out radiation paths correspond to a particular wavelength. The radiation intensities of each wavelength are measured by a detector array 39 having a plurality of detector elements. One of the fanned-out radiation paths is the first radiation path 21 which ends in the first detector element 31. At the end of a second radiation path 22 a second detector element 32 is arranged.

Figure 7:
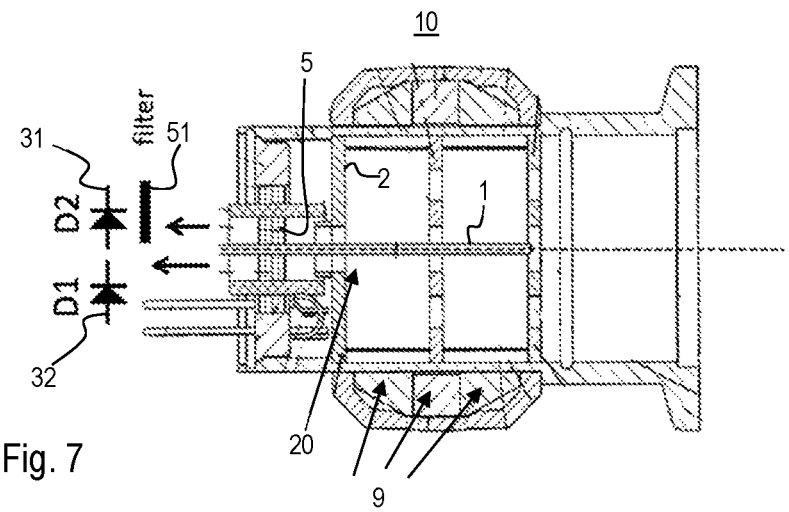
FIG. 7 shows a schematic cross-section through an embodiment of a vacuum pressure sensor.

FIG. 7 shows a cross-section of an embodiment based on a vacuum pressure sensor as described in detail in the publication CH 707 685 A1. This vacuum pressure sensor comprises a permanent magnet arrangement 9 for generating a magnetic field in the sample chamber, wherein the magnetic field is largely shielded from the outside. The embodiment shown has a high-voltage feedthrough 5 which is transmissive in the optical region and thus has the function of a window 5. Two photodiodes D1 and D1 represented by their switching symbol are mounted in such a way that the light passing through the high-voltage feedthrough (symbolized here by two arrows) can be observed. Between the high-voltage feedthrough and photodiode D2, a filter 51 is arranged as a wavelength-selective element. Light falling from the sample chamber through the high-voltage feedthrough onto photodiode D1 remains unfiltered. Thus, the photodiode D2 has the function of the first detector element 31 and the photodiode D1 has the function of the second detector element 32, with which at least a second emission line from the unfiltered wavelength range can be observed. The filter characteristic of the filter 51 and the sensitivity of the photodiodes can be selected in the shown embodiment, for example, as explained below for FIG. 8. For the stability of the obtained signals it is advantageous to use photodiodes of the same type. Alternatively, both photodiodes can be provided with a filter, each adapted for the first and second wavelength range to be measured. On the right side of the figure, a standard vacuum flange can be seen, with which the vacuum pressure sensor can be connected to a vacuum system, so that the sample chamber 20 is fluid-dynamically connected to the vacuum system.

Figure 8:
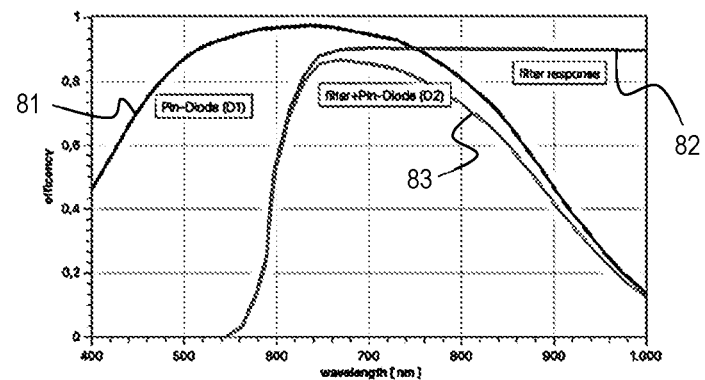
FIG. 8 shows an example of a determination of a first and second wavelength range by means of a wavelength-selective element, in SUBFIGS. 8.a) and 8.b) each efficiency curves as a function of wavelength.
Figure 8:
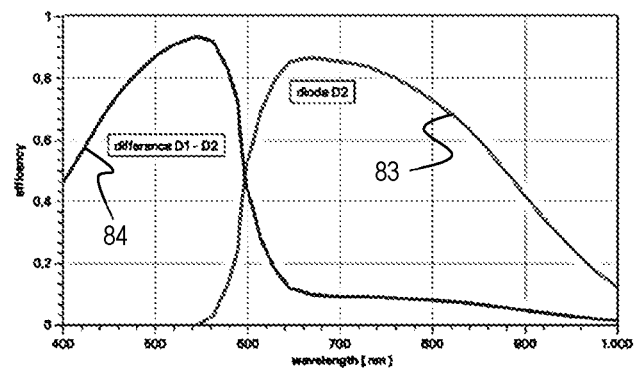

FIG. 8.*a*) shows for the wavelength range from 400 nm to 1000 nm drawn on the horizontal axis the sensitivity 81 of a photodiode D1, the transmission characteristic 82 of a filter 51 and the combined sensitivity curve 83, which results for a photodiode D2 identical to photodiode D1 with filter 51 connected in series. In the example shown, the filter has a stopband below the cutoff wavelength of 600 nm.

FIG. 8.*b*) shows for the same wavelength range as FIG. 8.*a*) a sensitivity distribution 84, which results by difference formation from the unfiltered sensitivity and the sensitivity achieved with upstream filter. A first wavelength range of about 600-900 nm can be selected by the first sensitivity distribution 83 generated in this way, and a first wavelength range of about 400-600 nm can be selected by the second sensitivity distribution 84. Thus, a first radiation intensity can be measured as a voltage across photodiode D2 and a second radiation intensity can be measured as a voltage across photodiode D1. Thus, with the configuration described herein, in the case of a nitrogen plasma, a first and a second radiation intensity are measured integrally across a plurality of plasma species emission lines.

LIST OF REFERENCE SIGNS

1 First electrode
2 Second electrode
3 Measurement chamber
4 Connection opening
5 Window
5' Window area (facing the sample chamber)
6 Wall of the measurement chamber
7 Electrical connections
8 Permanent magnet array
9 Magnetic element
10 Pressure sensor
20 Sample chamber
20' Area of maximum glow in the sample
21 Electromagnetic radiation of a first wavelength range
22 Electromagnetic radiation of a second wavelength range
30 Miniature spectrometer
31 First detector element
32 Second detector element
33, 34, 35, 36, 37, 38 Further detector elements
39 Detector array
41 High-voltage source
42 Current intensity measuring device
43 Circuit board (carries detector element)
44 Circuit board (carries power supply)
51 Filter
52 Lens
53 Slot
54 Optical grating
81 Sensitivity of a photodiode
82 Transmission characteristic of a filter
83 First sensitivity distribution
84 Second sensitivity distribution
100 Method for determining a pressure
101 Method step of generating a plasma
102 Method step of measuring a current intensity
103 Method step of measuring a first radiation intensity
104 Method step of measuring a second radiation intensity
105 Method step of determining the pressure
N, S North/south poles of a permanent magnet array
I Intensity
I_1 First radiation intensity
I_2 Second radiation intensity
C_plasma Current intensity through the plasma
N2, NI, NII, NIII Plasma species of nitrogen
p Pressure
p0 Estimated value for the pressure
W1, W1', W1" First wavelength range
W2, W2', W2" Second wavelength range
λ Wavelength
START Starting point of a method
END End point of a method

The invention claimed is:

1. Method (100) for determining a pressure in a vacuum system, wherein the method comprises the steps of:
 a) generating (101) a plasma in a sample chamber (20) which is fluid-dynamically connected to the vacuum system and wherein the plasma is in electrical contact with a first electrode and a second electrode;
 b) measuring (102) a current intensity (C_plasma) of an electrical current flowing through the plasma between the first electrode and the second electrode;
 c) measuring (103) a first radiation intensity (I_1) of electromagnetic radiation of a first wavelength range which is emitted from the plasma, wherein the first wavelength range contains at least a first emission line of a first plasma species of a first chemical element;
 d) measuring (104) a second radiation intensity (I_2) of electromagnetic radiation of a second wavelength range, which is emitted from the plasma, wherein the second wavelength range contains a second emission line of the first plasma species of the first chemical element or of a second plasma species of the first chemical element, and wherein the second emission line lies outside the first wavelength range; and
 e) determining (105) the pressure (p) in the vacuum system as a function of the measured current intensity (C_plasma), the measured first radiation intensity (I_1) and the measured second radiation intensity (I_2).

2. Method (100) according to claim 1, wherein in step e) of determining (105) the pressure in the vacuum system, based on the measured first radiation intensity and the measured second radiation intensity, an estimated value (p0) of the pressure is determined, wherein a definition range of a pressure-current intensity calibration curve is restricted to a pressure range which contains the estimated value and in which the pressure-current intensity calibration curve is monotonic, and wherein based on the pressure-current intensity calibration curve in the restricted definition range and based on the measured current intensity, the pressure in the vacuum system is determined.

3. Method (100) according to claim 2, wherein a logarithm of the estimated value (p0) of the pressure is determined using formula $$\log(p0) = a(I\_1/I\_2) + b,$$

wherein a and b are pre-determined coefficients that depend on a choice of emission lines, an arrangement used to generate the plasma, and a basis of the logarithm.

4. A vacuum pressure sensor (10), comprising:
a sample chamber (20) in which a plasma can be generated, wherein the sample chamber has electrical contact with a first electrode (1) and with a second electrode (2),
a current measuring device (42) electrically connected to the first and to the second electrodes and connected in series with the sample chamber,
a wavelength-selective element (51, 54),
a first (31) and a second detector element (32) for measuring a radiation intensity of an electromagnetic radiation,
  wherein the wavelength-selective element, the first detector element and the second detector element are arranged such that in the first detector element only electromagnetic radiation of a first wavelength range emanating from the sample chamber can arrive, and that in the second detector element only electromagnetic radiation of a second wavelength range emanating from the sample chamber can arrive, and
  wherein at least a first emission line of a first plasma species of a first chemical element lies in the first wavelength range, wherein a second emission line of the first plasma species of the first chemical element or of a second plasma species of the first chemical element lies in the second wavelength range, and wherein the second emission line lies outside the first wavelength range, and
a measurement chamber (3) surrounding the sample chamber, having a window (5) in a wall or as a wall of the measurement chamber,
wherein the window is transparent in an optical wavelength range and wherein a continuous first radiation path is defined which, starting from the sample chamber, traverses the window and ends in the first detector element, and
wherein a continuous second radiation path is defined which, starting from the sample chamber, traverses the window and ends in the second detector element.

5. Vacuum pressure sensor (10) according to claim 4, wherein the first detector element (31) and/or the second detector element (32) is a photodiode, a phototransistor, a charge coupled device, a multi-channel plate, or a channel electron multiplier.

6. Vacuum pressure sensor (10) according to claim 4, wherein the vacuum pressure sensor comprises a miniature spectrometer (30) having a detector array (39) and that the first detector element (31) and the second detector element (32) are elements of the detector array.

7. Vacuum pressure sensor (10) according to claim 4, wherein the vacuum pressure sensor comprises a device (8) for generating a magnetic field in the sample chamber (20).

8. Vacuum pressure sensor (10) according to claim 7, wherein the arrangement of first electrode (1), second electrode (2) and the device (8) for generating a magnetic field in the sample chamber is designed such that by applying an electric voltage to the electrodes an electric field can be generated which is aligned in the sample chamber substantially perpendicular to the magnetic field, in particular wherein the arrangement is designed as a magnetron array, inverted magnetron array or Penning array.

9. Vacuum pressure sensor (10) according to claim 4, further comprising an energy source for supplying energy to a plasma in the sample chamber.

10. Vacuum pressure sensor (10) according to claim 9, wherein the energy source comprises a high-voltage source (41) which is electrically conductively connected to the first and second electrodes and which is connected in series to the current measuring device.

11. Vacuum pressure sensor (10) according to claim 9, wherein the energy source comprises an AC power source and an induction coil, wherein the induction coil is electrically connected to the AC power source and adapted to generate an alternating magnetic field in the sample chamber when AC power is passed through the induction coil.

12. A device for carrying out (100) a method for determining a pressure in a vacuum system, wherein the method comprises the steps of:
a) generating (101) a plasma in a sample chamber (20) which is fluid-dynamically connected to the vacuum system and wherein the plasma is in electrical contact with a first electrode and a second electrode;
b) measuring (102) a current intensity (C_plasma) of an electrical current flowing through the plasma between the first electrode and the second electrode;
c) measuring (103) a first radiation intensity (I_1) of electromagnetic radiation of a first wavelength range which is emitted from the plasma, wherein the first wavelength range contains at least a first emission line of a first plasma species of a first chemical element;
d) measuring (104) a second radiation intensity (I_2) of electromagnetic radiation of a second wavelength range, which is emitted from the plasma, wherein the second wavelength range contains a second emission line of the first plasma species of the first chemical element or of a second plasma species of the first chemical element, and wherein the second emission line lies outside the first wavelength range; and
e) determining (105) the pressure (p) in the vacuum system as a function of the measured current intensity (C_plasma), the measured first radiation intensity (I_1) and the measured second radiation intensity (I_2),
the device comprising
a vacuum pressure sensor according to claim 4, and a processing unit,
wherein the processing unit is operatively connected to the current intensity measuring device (42), the first (31) and a second detector element (32) for electromagnetic radiation for transmitting the measured current intensity (C_plasma), the measured first radiation intensity (I_1) and the measured second radiation intensity (I_2), and is adapted to determine as a function thereof the pressure (p) in the vacuum system.

13. A method for extending a pressure measurement range of a vacuum pressure sensor based on a measurement of a current intensity by a plasma, to a pressure measurement range comprising both pressures below and pressures above an extreme value of a pressure-current intensity characteristic curve of the vacuum pressure sensor, the method comprising the method for determining a pressure in a vacuum system according to claim 1.

14. A method (100) for determining a pressure in a vacuum system, wherein the method comprises the steps of:
a) generating (101) a plasma in a sample chamber (20) which is fluid-dynamically connected to the vacuum system and wherein the plasma is in electrical contact with a first electrode and a second electrode;

b) measuring (102) a current intensity (C_plasma) of an electrical current flowing through the plasma between the first electrode and the second electrode;

c) measuring (103) a first radiation intensity (I_1) of electromagnetic radiation of a first wavelength range which is emitted from the plasma, wherein the first wavelength range contains at least a first emission line of a first plasma species of a first chemical element;

d) measuring (104) a second radiation intensity (I_2) of electromagnetic radiation of a second wavelength range, which is emitted from the plasma, wherein the second wavelength range contains a second emission line of the first plasma species of the first chemical element or of a second plasma species of the first chemical element, and wherein the second emission line lies outside the first wavelength range; and e) determining (105) the pressure (p) in the vacuum system as a function of the measured current intensity (C_plasma), the measured first radiation intensity (I_1) and the measured second radiation intensity (I_2)

wherein the method is carried out by the pressure sensor of claim 4 and a processing unit.

* * * * *